US011915113B2

(12) United States Patent
Beaver

(10) Patent No.: US 11,915,113 B2
(45) Date of Patent: Feb. 27, 2024

(54) DISTRIBUTED SYSTEM FOR SCALABLE ACTIVE LEARNING

(71) Applicant: Verint Americas Inc., Alpharetta, GA (US)

(72) Inventor: Ian Roy Beaver, Spokane, WA (US)

(73) Assignee: Verint Americas Inc., Alpharetta, GA (US)

(*) Notice: Subject to any disclaimer, the term of this patent is extended or adjusted under 35 U.S.C. 154(b) by 568 days.

(21) Appl. No.: 16/810,389

(22) Filed: Mar. 5, 2020

(65) Prior Publication Data

US 2020/0311477 A1 Oct. 1, 2020

Related U.S. Application Data

(60) Provisional application No. 62/814,903, filed on Mar. 7, 2019.

(51) Int. Cl.
*G06F 16/2453* (2019.01)
*G06N 20/20* (2019.01)
*G06N 20/00* (2019.01)
*G06N 3/08* (2023.01)
*G06F 18/214* (2023.01)

(52) U.S. Cl.
CPC ........ *G06N 20/20* (2019.01); *G06F 16/2453* (2019.01); *G06F 18/2155* (2023.01); *G06N 3/08* (2013.01); *G06N 20/00* (2019.01)

(58) Field of Classification Search
CPC ........ G06K 9/6259; G06N 20/00; G06N 3/08; G06F 16/2453
See application file for complete search history.

(56) References Cited

U.S. PATENT DOCUMENTS

| | | | | |
|---|---|---|---|---|
| 7,292,976 | B1 * | 11/2007 | Hakkani-Tur | G06F 40/284 704/231 |
| 11,182,691 | B1 * | 11/2021 | Zhang | G06N 20/20 |
| 2007/0094158 | A1 * | 4/2007 | Osoda | G06N 3/08 706/12 |
| 2010/0312725 | A1 * | 12/2010 | Privault | G06N 5/043 706/54 |
| 2020/0104705 | A1 * | 4/2020 | Bhowmick | G06N 3/04 |
| 2020/0250527 | A1 * | 8/2020 | Zhao | G06N 3/047 |
| 2020/0388358 | A1 * | 12/2020 | Chen | G06F 18/41 |

OTHER PUBLICATIONS

Shen et al., "Distributed Active Learning", Jun. 2016, in IEEE Access, vol. 4, pp. 2572-2579, 2016, doi: 10.1109/ACCESS.2016. 2572198. (Year: 2016).*

(Continued)

*Primary Examiner* — Hosain T Alam
*Assistant Examiner* — Robert F May
(74) *Attorney, Agent, or Firm* — Meunier Carlin & Curfman, LLC

(57) ABSTRACT

According to principles described herein, a system applies Active Learning methodology to multiple models simultaneously. The system includes a means to distribute the sample selection algorithm across large pools of unlabeled data and a automatic model training deployed on hardware matched to the model type that scales to large volumes of data without consuming all resources.

18 Claims, 4 Drawing Sheets

(56) References Cited

OTHER PUBLICATIONS

Xiao et al., "Learning better while sending less: Communication-efficient online semi-supervised learning in client-server settings", Oct. 2015 IEEE International Conference on Data Science and Advanced Analytics (DSAA), 2015, pp. 1-10, doi: 10.1109/DSAA.2015.7344833. (Year: 2015).*
Mehrjou et al., "Distribution Aware Active Learning", May 2018, ArXiv abs/1805.08916 (2018): n. pag. (Year: 2018).*
"Active learning (machine learning)," Wikipedia, retrieved on Jun. 26, 2020 from https://en.wikipedia.org/w/index.php?title=Active_learning_(machine_learning)&oldid=884869038, 2019, 4 pages.
Lewis, D., et al., "A Sequential Algorithm for Training Text Classifiers," Research and Development in Information Retrieval, 1994, pp. 3-12.
Settles, B., "Active Learning Literature Survey," Computer Sciences Technical Report 1648, University of Wisconsin-Madison, 2010, 67 pages.
Search Report, dated Jun. 26, 2020, received in connection with corresponding EP Patent Application No. 20161669.5.

* cited by examiner

DISTRIBUTED SYSTEM FOR SCALABLE ACTIVE LEARNING

This application claims priority to U.S. Provisional Patent Application Ser. No. 62/814,903, filed Mar. 7, 2019, which is hereby incorporated by this reference in its entirety as if fully set forth herein.

BACKGROUND

Field

Embodiments of the present invention relate to a system and method for Scalable Active Learning, and more specifically, a distributed system to overcome scaling issues associated with Active Learning on large volumes of data.

Background

Human-in-the-loop (HITL) is a sub field of Artificial Intelligence where the model requires some form of human interaction. A common HITL approach to Machine Learning is known as Active Learning (AL). With active learning an existing model is supplied with a large pool or stream of unlabeled samples. The model then chooses which samples it thinks would be most informative to know the label for based on some selection strategy, of which there are several commonly used [1]. Human oracles (also referred to as annotators) are then shown the selected samples and give them labels. These labeled samples are added to the training data to retrain the model from. Once retrained, the process can then iterate again until the model performance is acceptable or no further improvements are observed. In this way the model will learn more quickly from less training data then given a large sample of labeled results that contain many duplicated features. This active learning process is shown in FIG. 1.

One of the drawbacks to AL is that the selection process requires the model to consider every unlabeled sample in order to decide which samples would be most informative to learn from. As the volume of unlabeled data grows, this selection process becomes time prohibitive. Another issue is the requirement for the model to be retrained every iteration once labels have been obtained from humans. As the volume of labeled data grows, the training time is also prohibitive. Accordingly, provided herein is a distributed system to overcome scaling issues associated with Active Learning on large volumes of data.

BRIEF SUMMARY OF THE DISCLOSURE

Accordingly, the present invention is directed to a system and method for scalable active learning that obviates one or more of the problems due to limitations and disadvantages of the related art.

In accordance with the purpose(s) of this invention, as embodied and broadly described herein, this invention, in one aspect, relates to A method of scaling active learning across a distributed system, the method including a plurality of distributed processing devices performing operations comprising: allocating a first subset of a pool of unlabeled training data to a first processing device of at least two of the distributed processing devices and allocating a second subset of the pool of the unlabeled training data to a second processing device of the at least two of the distributed processing devices; providing a query strategy to each of the at least two of the distributed processing devices for applying a machine learned model to the first and second subset; and receiving from each of the at least two of the distributed processing devices labeled selected samples.

In another aspect, the invention relates to a system, comprising: a processing device; and a memory device in which instructions executable by the processing device are stored for causing the processor to allocate a first subset of a pool of unlabeled training data to a first processing device of at least two of the distributed processing devices and allocating a second subset of the pool of the unlabeled training data to a second processing device of the at least two of the distributed processing devices; provide a query strategy to each of the at least two of the distributed processing devices for applying a machine learned model to the first and second subset; and receive from each of the at least two of the distributed processing devices labeled selected samples.

In yet another aspect, the invention relates to a non-transitory computer-readable storage medium having program code that is executable by a processor to cause a computing device to perform operations, the operations comprising: allocating a first subset of a pool of unlabeled training data to a first processing device of at least two of the distributed processing devices and allocating a second subset of the pool of the unlabeled training data to a second processing device of the at least two of the distributed processing devices; providing a query strategy to each of the at least two of the distributed processing devices for applying a machine learned model to the first and second subset; and receiving from each of the at least two of the distributed processing devices labeled selected samples.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

Further embodiments, features, and advantages of the system and method for scalable active learning, as well as the structure and operation of the various embodiments of the system and method for scalable active learning, are described in detail below with reference to the accompanying drawings.

It is to be understood that both the foregoing general description and the following detailed description are exemplary and explanatory only, and are not restrictive of the invention as claimed.

BRIEF DESCRIPTION OF THE DRAWINGS

The accompanying figures, which are incorporated herein and form part of the specification, illustrate system and method for scalable active learning. Together with the description, the figures further serve to explain the principles of the system and method for scalable active learning described herein and thereby enable a person skilled in the pertinent art to make and use the system and method for scalable active learning.

DETAILED DESCRIPTION

Reference will now be made in detail to embodiments of the system and method for scalable active learning with reference to the accompanying figures The same reference numbers in different drawings may identify the same or similar elements.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Figure 1:
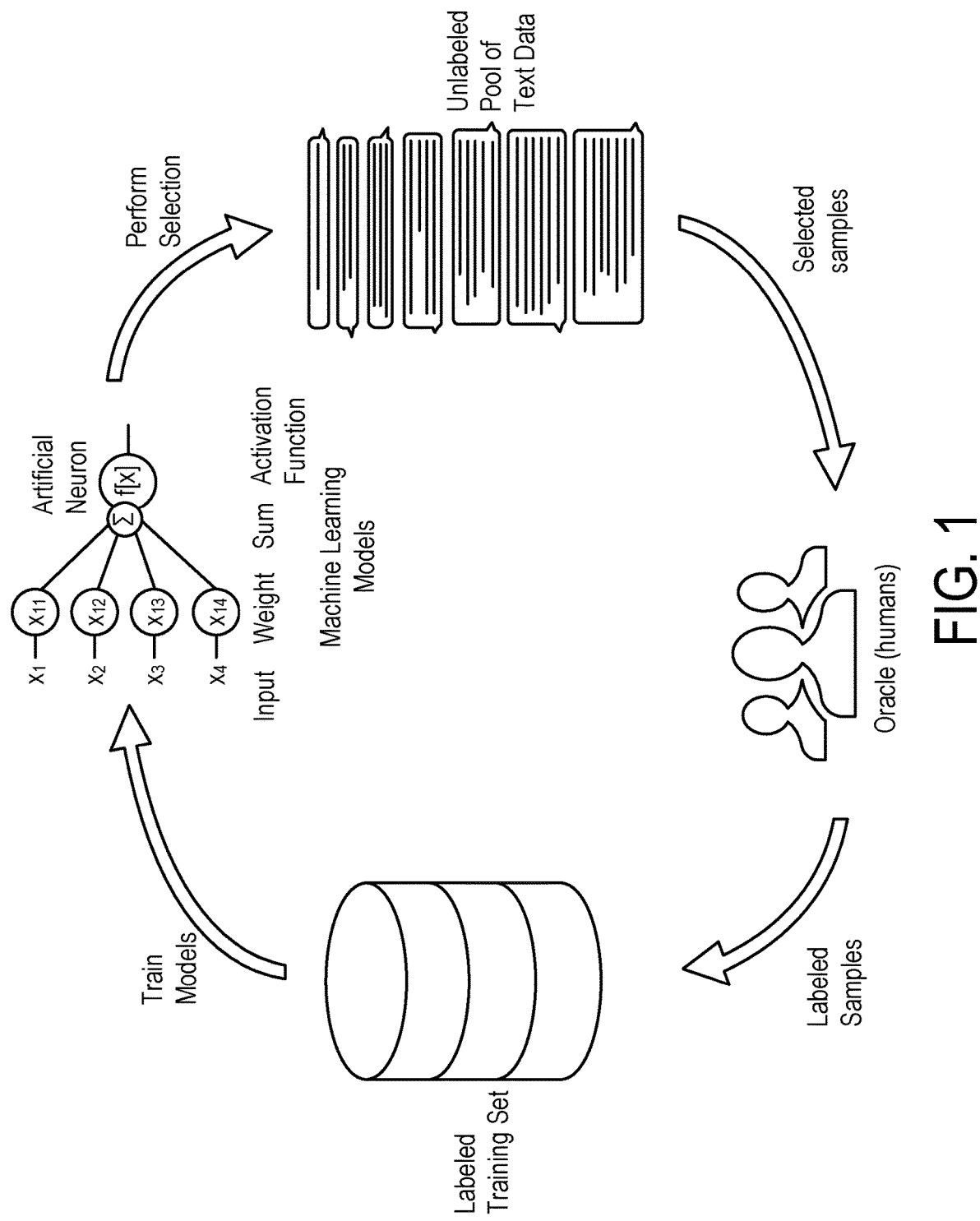
FIG. 1 illustrates an active learning cycle for a pool of text data.
Figure 2:
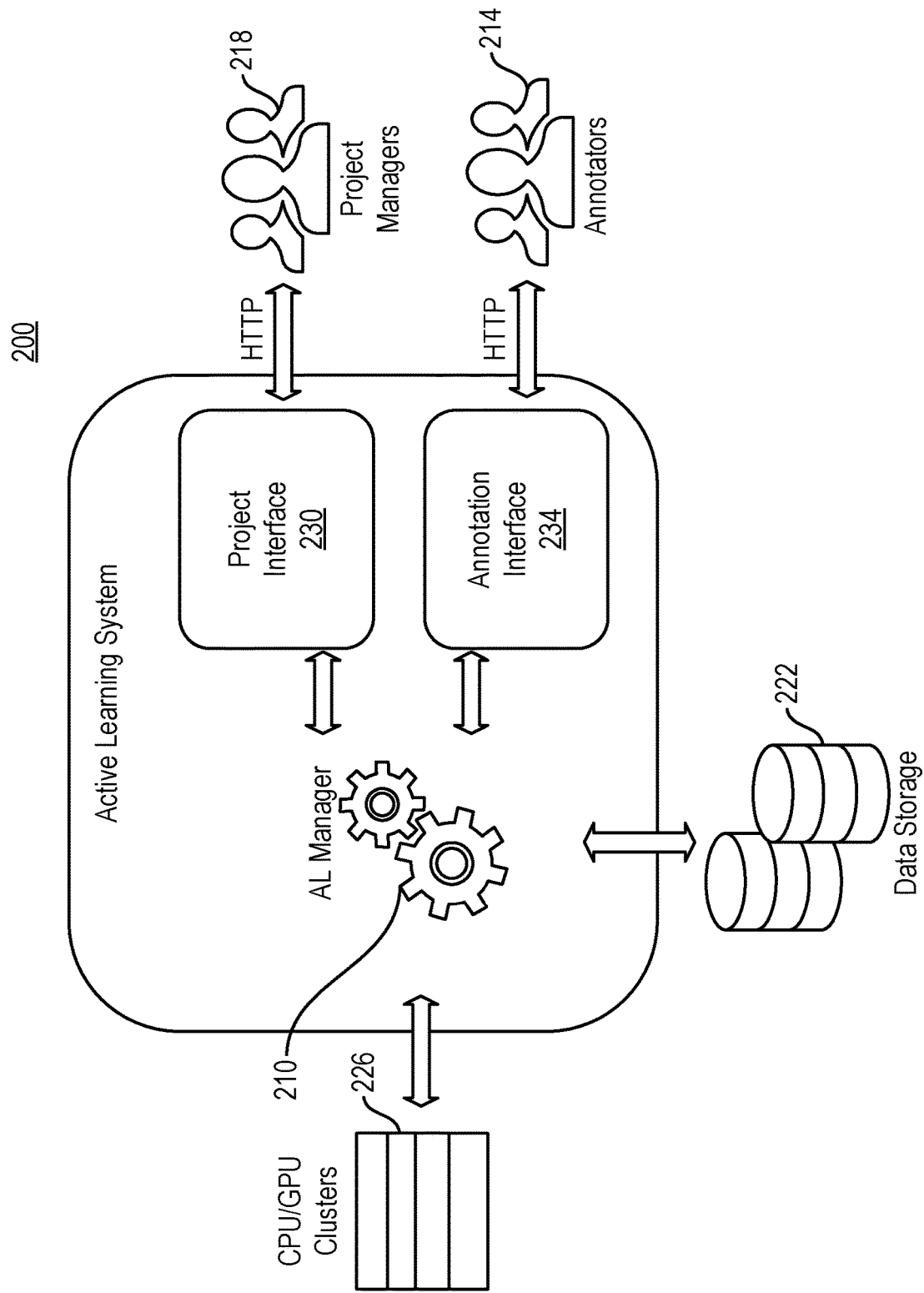
FIG. 2 illustrates users interfacing with an active learning system according to principles described herein
Figure 3:
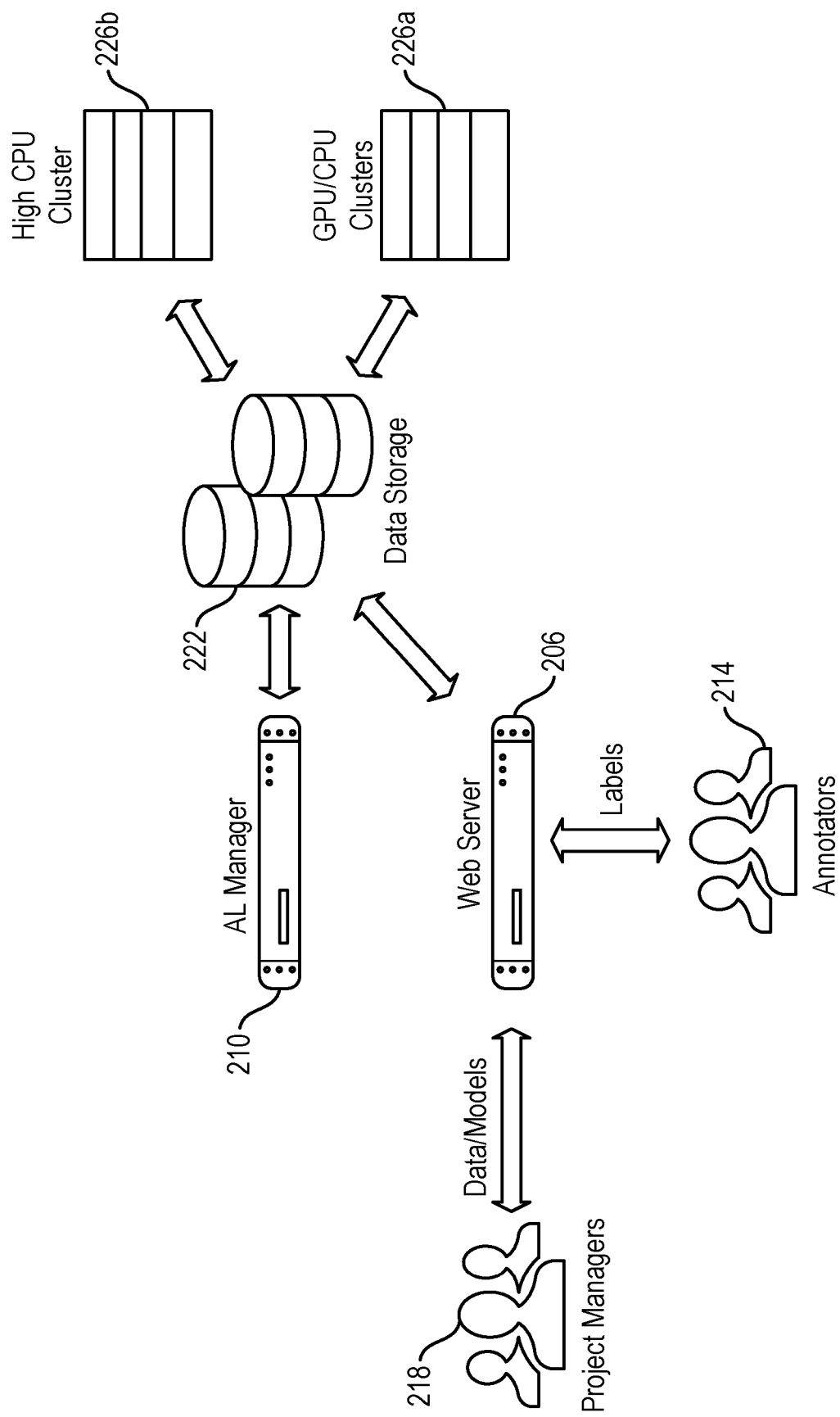
FIG. 3 illustrates component of an active learning system according to principles described herein.

Looking to FIG. 2, a distributed active learning (AL) system 200 according to principles described herein includes four (4) components: an AL manager 210 that orchestrates an active learning cycle like the one shown in FIG. 1; a web server 206, which may, for example, host the interfaces used by the human annotators 214 and project managers 218; a central data store 222; and a compute cluster 226. As illustrated in FIG. 3, the compute cluster 226 can be further divided between nodes with General Purpose Graphics Processing Units (GPGPUs) 226a and those without them 226b.

There are two roles of users that interact with the system, but they may in reality be the same person or people. The first is project managers who have access to the project interface 230 within the system. The project managers 218 are responsible for creating a project within the system and specifying model construction and parameters. They also add unlabeled data into the system to be used by the model to select new training samples.

Once a project is defined and the AL cycle has been initiated, the second group of human users are the annotators. When the samples have been selected to be labeled, the annotators use an annotation interface provided by the system to add labels, or, they can optionally download the data and annotate it using some external software, such a word processor or spreadsheet. Examples of these user interactions are shown in FIG. 2. Once annotated, the labels are saved with the samples in the data storage and the AL cycle can continue. These components and the data movements between them are shown in FIG. 3.

Once the AL process has completed either a predefined number of times or when the model performance reaches some threshold, the cycle stops and the resulting model is available to the project managers to download and use in external systems.

Process Flow

The AL cycle begins after the project manager has defined the type of model to build and its parameters, and defined other settings such as the number of iterations or stopping threshold. The AL manager component tracks the progress of all active projects and maintains state such as alerting annotators when selection is done, or notifying project managers when a model is complete or a failure occurred in some stage of the cycle.

Figure 4:
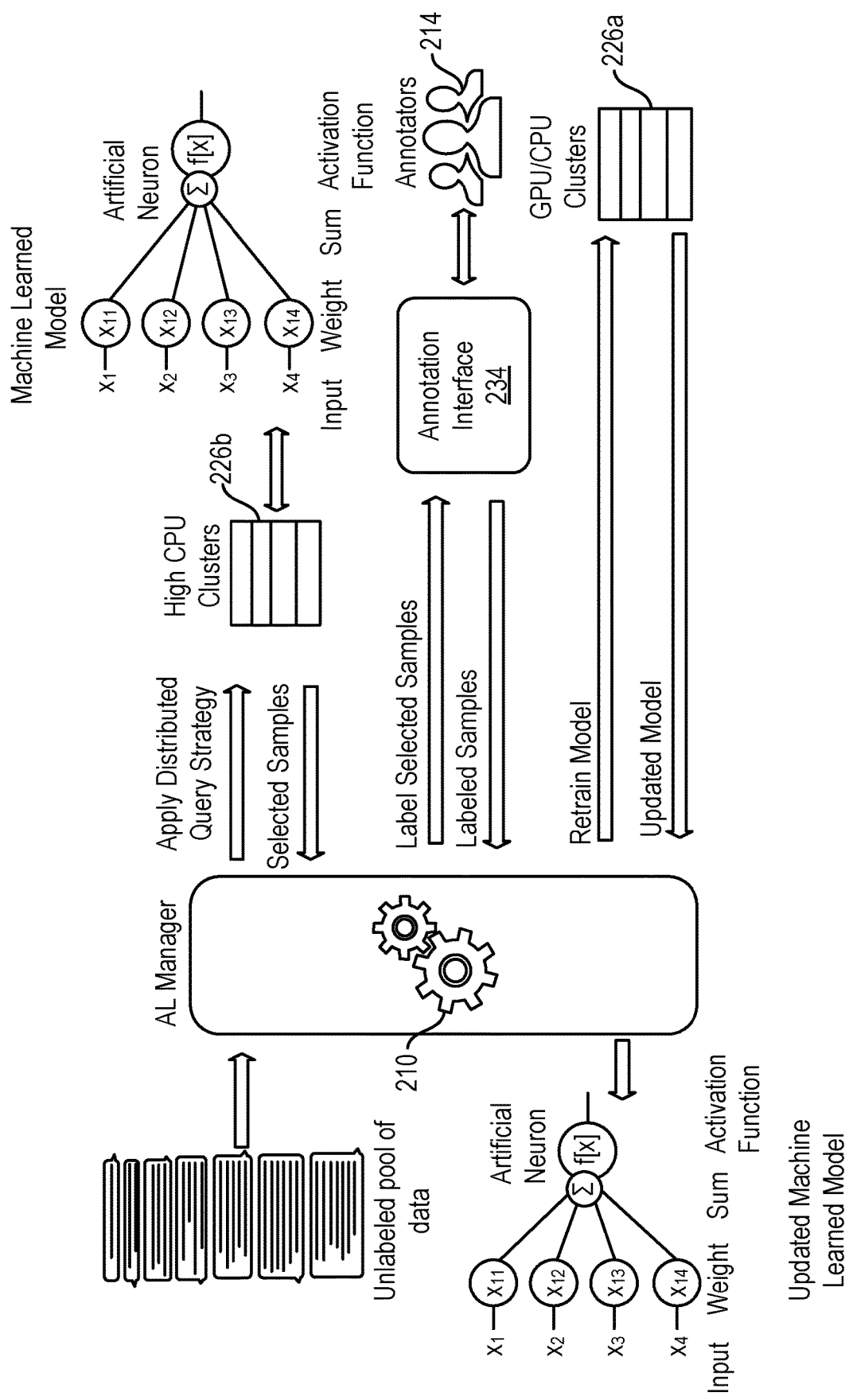
FIG. 4 illustrates a process flow through a distributed active learning in a single iteration of the active learning cycle system according to principles described herein.

In FIG. 4, the location of the unlabeled pool of data is specified by the project manager when a new project is created. Once the AL cycle begins, the unlabeled pool is shared with a compute cluster that applies the existing machine learned model in parallel to the pool. The query strategy to apply is selected by the project manager when creating the project. Each query strategy has been modified to work in parallel. For example, if the query strategy of model confidence is used to select samples, the original strategy would require applying the model to every sample then taking the n samples where the model confidence is the lowest. In the distributed form according to principles described herein, the data is partitioned across m tasks or processes across the compute cluster. Therefore, the query strategy is modified so that each task or process on the cluster returns the n/m samples, where the model confidence is lowest in each individual process. In this way there are still n samples to be labeled, but they are discovered in parallel with a speedup of m times. Accordingly, the system can select which inputs it will learn the most from.

Once the samples are selected in parallel, the AL manager displays them in the Annotation Interface and notifies the annotators that work is available. Optionally, the samples can be downloaded in spreadsheet form for use in external annotation or spreadsheet software. They can also be given to external annotation or crowd-sourcing companies to be labeled. Once external labeling is complete, the interface allows uploading of the labels to be imported into the data store with the samples. Otherwise, as the annotators label samples in the provided interface, the labels are stored with the samples in the data storage. The data storage component could be a database or file format organized on a file system.

After all selected samples have an associated annotation, the AL manager component initiates training a new model incorporating the original training data and the newly labeled samples. This training data is sent to dedicated servers that are optimized for the model type selected. For example, if the model training library is written to take advantage of GPGPUs, the AL manager will send the training data to nodes with that capability.

In an aspect according to the present principles, to manage the training, each model type supported by the system may specify a Docker container specification file. Docker containers are lightweight operating system level virtualization as opposed to virtual machines, which require a complete operating system to be installed within them. Containers bundle their own tools, libraries, and configuration and are therefore portable between host systems.

All of the model types supported by the system have the ability to be trained on batches of data, which prevents large volumes of training data from consuming all of the memory on the system and crashing it. Using batches, a theoretically infinite amount of training data can be fed into a model while maintaining a constant memory footprint. This batch training along with the container format allows the AL manager to deploy training processes on demand across the cluster on hardware optimal for the particular model to be constructed. This allows multiple projects to be running simultaneously without having to wait for one model to train until a model from a different project can be trained.

Once the training process is complete, the AL manager either continues the cycle for another iteration if the stopping conditions have not been met, or notifies the project managers that the model is complete if the maximum iterations or performance thresholds have been met. Once complete, the project managers can download the model in a portable format to be deployed in various tasks requiring a machine-learned model. Accordingly, the principles described herein, provide a system for applying Active Learning methodology to multiple models simultaneously; a means to distribute the sample selection algorithm across large pools of unlabeled data; and a means to automatically deploy model training on optimal hardware for the model type that scales to large volumes of data without consuming all resources.

The present architecture allows for more quick training of models, for example, multiple models in parallel, which allows for selection of a "best" model more quickly. Because the data is labeled at the end of the process, the models can be scored and evaluated as to which model or query strategy is most appropriate for the user needs. Accordingly, computational complexity of selecting a model is reduced, thereby saving computational resources, such as CPU times and memory spaces.

The present architecture may be implemented in a computer system or processor capable of executing program code to perform the steps described herein. For example, system may be a computing system that includes a processing system, storage system, software, communication interface and a user interface. The processing system loads and executes software from the storage system. When executed by the computing system, software module directs the processing system to operate as described in herein in further detail, including execution of the cross-entropy ranking system described herein.

The processing system can comprise a microprocessor and other circuitry that retrieves and executes software from storage system. Processing system can be implemented within a single processing device but can also be distributed across multiple processing devices or sub-systems that cooperate in existing program instructions. Examples of processing system include general purpose central processing units, applications specific processors, and logic devices, as well as any other type of processing device, combinations of processing devices, or variations thereof.

The storage system can comprise any storage media readable by processing system, and capable of storing software. The storage system can include volatile and non-volatile, removable and non-removable media implemented in any method or technology for storage of information, such as computer readable instructions, data structures, program modules, or other data. Storage system can be implemented as a single storage device but may also be implemented across multiple storage devices or sub-systems. Storage system can further include additional elements, such a controller capable, of communicating with the processing system.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to storage the desired information and that may be accessed by an instruction execution system, as well as any combination or variation thereof, or any other type of storage medium. In some implementations, the store media can be a non-transitory storage media. In some implementations, at least a portion of the storage media may be transitory. It should be understood that in no case is the storage media a propagated signal.

Throughout this application, various publications may have been referenced. The disclosures of these publications in their entireties are hereby incorporated by reference into this application in order to more fully describe the state of the art to which this invention pertains.

REFERENCES

[1] Burr Settles. Active learning. *Synthesis Lectures on Artificial Intelligence and Machine Learning*, 6(1):1-114, 2012.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. A method of scaling active learning across a distributed active learning system, the system comprising a first processor and a plurality of distributed processing devices, the method including the first processor performing operations comprising:
   selecting a distributed query strategy for application to a pool of unlabeled data and partitioning the pool into a predetermined number of subsets of unlabeled training data;
   allocating each of the predetermined subsets to a respective one of the plurality of distributed processing devices;
   applying the selected distributed query strategy, wherein the selected distributed query strategy comprises a predetermined number of tasks, wherein the predetermined number of tasks equals the predetermined number of subsets and wherein the distributed query strategy is adapted to work in parallel across the plurality of distributed processing devices;
   receiving, from each of the plurality of distributed processing devices, a predetermined number (n) of resulting unlabeled samples after the selected query strategy is performed by the plurality of distributing processing devices, wherein confidence in the resulting unlabeled samples, determined by a machine learned model, is lowest;
   providing the resulting unlabeled samples for labeling to generate labeled selected samples;
   receiving the labeled selected samples; and
   retraining the machine learned model using the labeled selected samples.

2. The method of claim 1, wherein providing the resulting unlabeled samples for labeling comprises providing the predetermined number (n) of resulting samples on an annotation interface for display to a group of annotators for two or more annotators to label the predetermined number (n) of resulting samples and the receiving the labeled selected samples comprises receiving from the two or more annotators the labeled selected samples via the annotation interface.

3. The method of claim 2, wherein retraining the existing machine learned model is based on the labeled samples received from the two or more annotators.

4. The method of claim 3, wherein the retraining comprises providing the labeled selected samples to an additional at least two of the plurality of distributed processing devices and receiving an updated machine learned model from the additional at least two of the plurality of distributed processing devices.

5. The method of claim 4, wherein the additional at least two of the plurality of distributed processing devices includes the distributed processing device to which one of the predetermined subsets of unlabeled training data was allocated.

6. The method of claim 4, further comprising applying the updated machine learned model to a new pool of unlabeled data.

7. A system for scaling active learning across a distributed active learning system, the system comprising:
- a memory comprising executable instructions;
- a plurality of distributed processing devices; and
- a first processor configured to execute the executable instructions and cause the system to:
  - select a distributed query strategy for application to a pool of unlabeled data and partitioning the pool into a predetermined number of subsets of unlabeled training data;
  - allocate each of the predetermined subsets to a respective one of the plurality of distributed processing devices;
  - apply the distributed query strategy, wherein the selected distributed query strategy comprises a predetermined number of tasks, wherein the predetermined number of tasks equals the predetermined number of subsets, and wherein the query strategy is adapted to work in parallel across the plurality of distributed processing devices; and
  - receive from each of the plurality of distributed processing devices a predetermined number (n) of resulting unlabeled samples after the selected query strategy is performed by the plurality of distributing processing devices, wherein confidence in the resulting unlabeled samples, determined by a machine learned model, is lowest;
  - provide the resulting unlabeled samples for labeling to generate labeled selected samples;
  - receive the labeled selected samples, and
  - retrain the machine learned model using the labeled selected samples.

8. The system of claim 7, wherein the executable instructions executable further include instructions to cause the system to provide the labeled selected samples on an annotation interface for display to a group of annotators for two or more annotators to label the predetermined number (n) of resulting samples and to receive from the two or more annotators the labeled selected samples via the annotation interface.

9. The system of claim 8, wherein the executable instructions further include instruction for causing the processor to retrain the existing machine learned model based on the labeled samples received from the two or more annotators.

10. The system of claim 9, wherein the retraining comprises providing the labeled selected samples to an additional at least two of the plurality of distributed processing devices and receiving an updated machine learned model from the additional at least two of the plurality of distributed processing devices.

11. The system of claim 10, wherein the additional at least two of the plurality of distributed processing devices includes the plurality of distributed processing device to which one of the predetermined subsets of unlabeled training data was allocated.

12. The system of claim 10, wherein the executable instructions executable further include instruction for causing the system to further comprising apply the updated machine learned model to a new pool of unlabeled data.

13. A non-transitory computer-readable storage medium comprising instructions that, when executed by a first processor of a processing system, cause the processing system to perform a method, the method comprising:
- selecting a distributed query strategy for application to a pool of unlabeled data and partitioning the pool into a predetermined number of subsets of unlabeled training data;
- allocating each of the predetermined subsets to a respective one of a plurality of the distributed processing devices;
- applying the selected distributed query strategy, wherein the selected distributed query strategy comprises a predetermined number of tasks, wherein the predetermined number of tasks equals the predetermined number of subsets and wherein the distributed query strategy is adapted to work in parallel across the plurality of distributed processing devices;
- receiving from the plurality of distributed processing devices a predetermined number (n) of resulting unlabeled samples after the selected query strategy is performed by the plurality of distributing processing devices, wherein confidence in the resulting unlabeled samples, determined by a machine learned model, is lowest;
- providing the resulting unlabeled samples for labeling to generate labeled selected samples;
- receiving the labeled selected samples; and
- retraining the machine learned model using the labeled selected samples.

14. The non-transitory computer-readable storage medium of claim 13, wherein providing the resulting samples for labeling comprises providing the predetermined number (n) of resulting samples on an annotation interface for display to a group of annotators for two or more annotators to label the predetermined number (n) of resulting samples and the receiving comprises the labeled selected samples receiving from the two or more annotators the labeled selected samples via the annotation interface.

15. The non-transitory computer-readable storage medium of claim 14, wherein retraining the machine learned model is based on the labeled samples received from the two or more annotators.

16. The non-transitory computer-readable storage medium of claim 15, wherein the retraining comprises providing the labeled selected samples to an additional at least two of the distributed processing devices and receiving an updated machine learned model from the additional at least two of the plurality of distributed processing devices.

17. The non-transitory computer-readable storage medium of claim 16, wherein the additional at least two of the plurality of distributed processing devices includes the distributed processing device to which one of the predetermined subsets of unlabeled training data was allocated.

18. The non-transitory computer-readable storage medium of claim 16, the method further comprising applying the updated machine learned model to a new pool of unlabeled data.

* * * * *